UNITED STATES PATENT OFFICE.

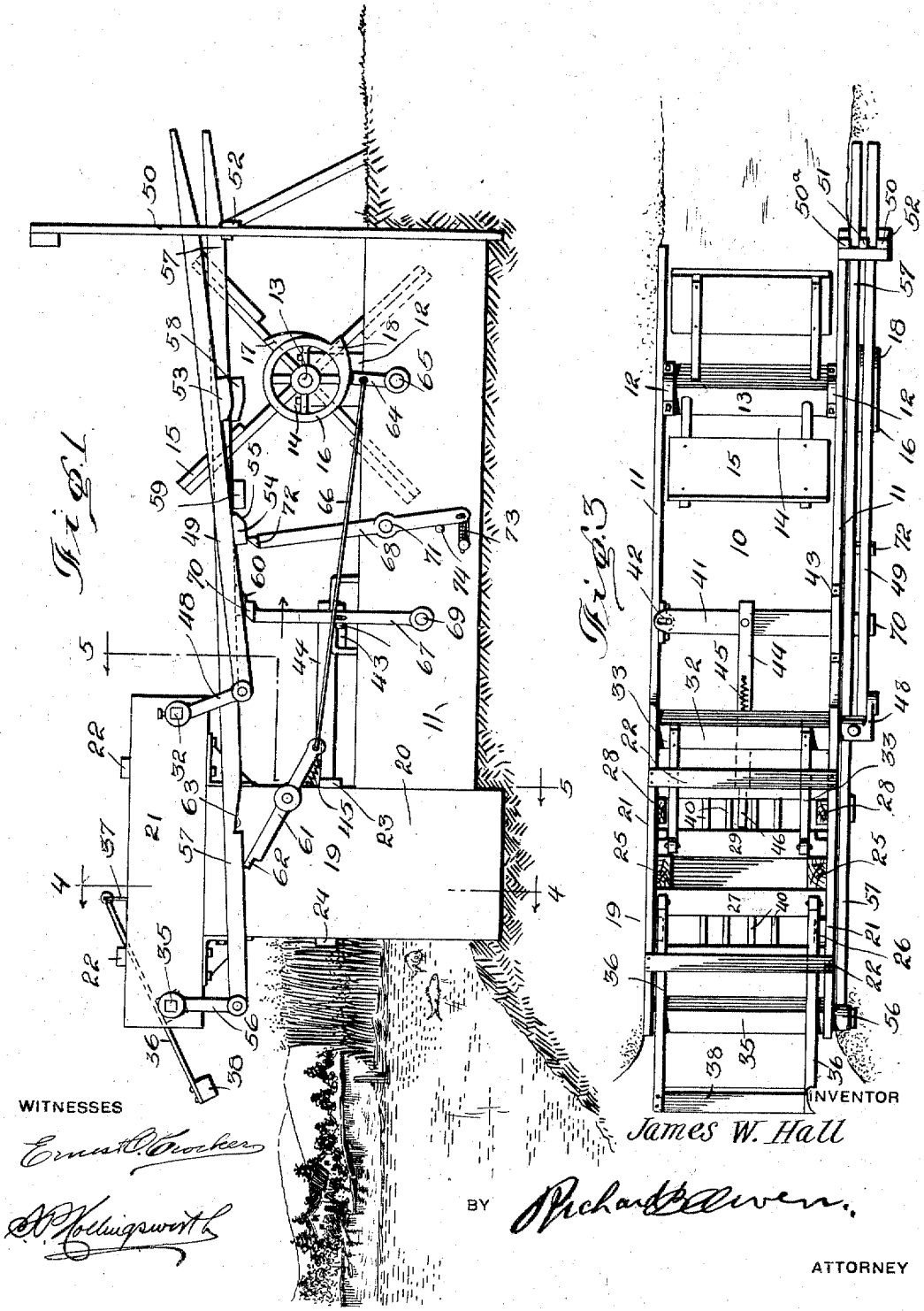

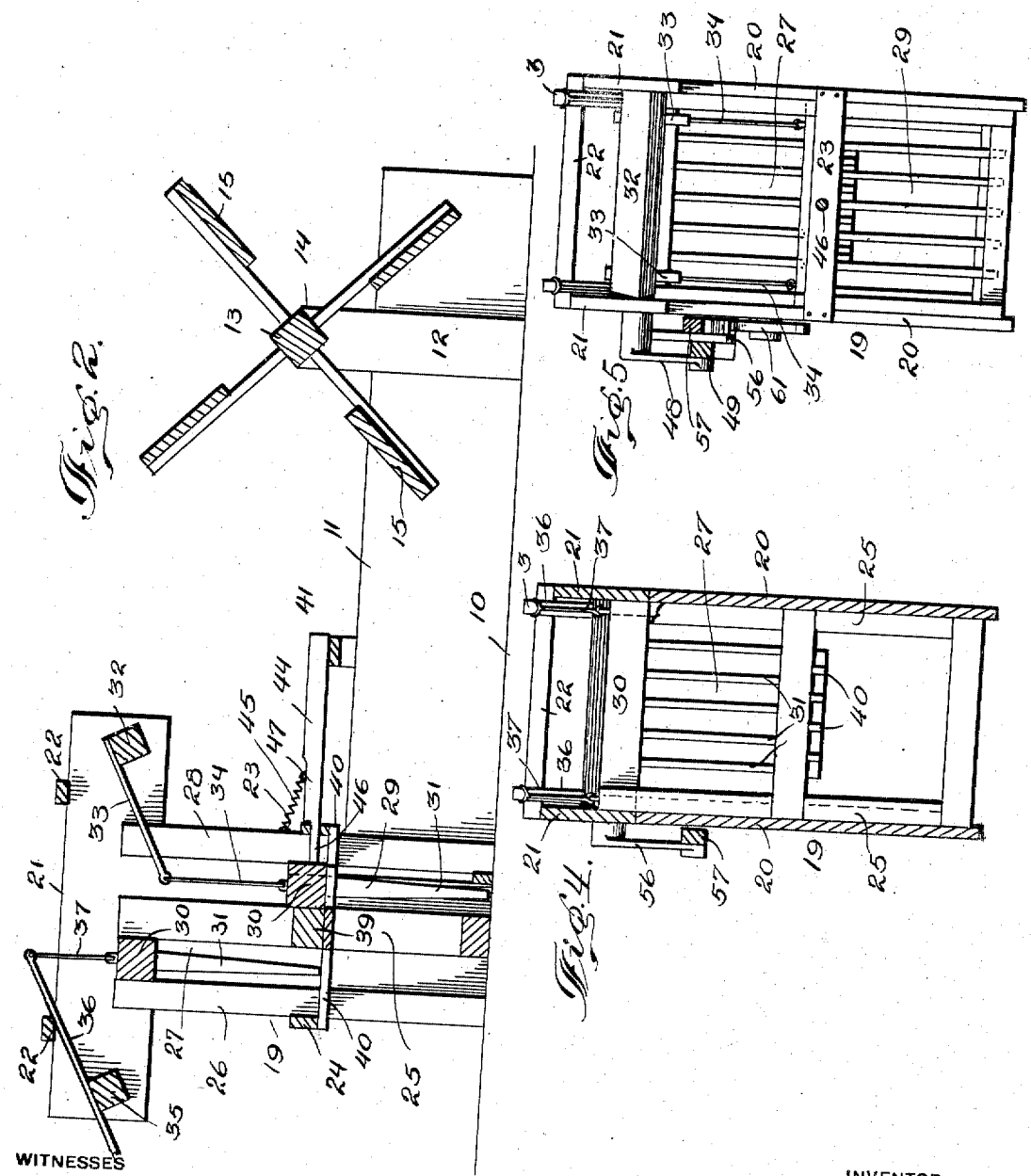

JAMES W. HALL, OF PARDEEVILLE, WISCONSIN.

FISH-STOP.

1,255,741.  Specification of Letters Patent.  Patented Feb. 5, 1918.

Application filed June 29, 1917. Serial No. 177,776.

*To all whom it may concern:*

Be it known that I, JAMES W. HALL, a citizen of the United States, residing at Pardeeville, in the county of Columbia and State of Wisconsin, have invented certain new and useful Improvements in Fish - Stops, of which the following is a specification.

This invention relates to fish stops for irrigating ditches, and has for its primary object to provide a device of this character designed to be placed in irrigating ditches and furnished with a screen for preventing the passage along the ditch with the water, of food fish which become lost through the shallowing of the ditches and final distribution of the water upon the land.

In connection with the screen devices are power means operated by a water current for raising the screen to cleanse the same from floating debris and simultaneously lowering a substituted screen, the movement of said screens being automatically operated by a trip device actuated by pressure against the primary screen.

Another object of the invention is to provide a fish gate having two screens vertically movable into and out of an irrigating ditch, one of said screens being maintained normally in the ditch to prevent the passage along the same of fish, but which upon the collection of debris through its inability to pass the screen, presses against the screen and disengages a trip that causes the power means operated by the current of water in the stream to raise the screen and release and clean the debris therefrom, at the same time lowering the other screens to form a barrier for the passage of fish during the elevation of the primary screen.

A further object of the invention is to provide in a fish stop a screen for preventing the passage through an irrigating ditch of fish, said screen being movable vertically to clean the same from debris and also having limited spring controlled movement in a longitudinal direction of the ditch whereby the trip device is operated when pressure of debris against the screen is sufficient, and means caused to engage the power wheel operated by the running current for raising said screen and simultaneously lowering a substitute screen to take the place of the primary screen while the latter is in elevated position.

With the above as the principal objects in view, the invention consists in the novel construction, combination and arrangement of parts hereinafter described, pointed out in the appended claims, and illustrated in the accompanying drawings, in which:—

Figure 1 is a side elevation of the complete fish stop apparatus before the same has been placed in an irrigating ditch, Fig. 2 is a vertical longitudinal section therethrough.

Fig. 3 is a top plan view of the complete fish stop,

Fig. 4 is a transverse sectional view on the line 4—4 of Fig. 1, and

Fig. 5 is a similar view on the line 5—5 of the same figure.

In the drawings, the apparatus comprises a flume formed of a bottom 10 and vertical sides 11 that are designed to fit against the bottom and sides of an irrigating ditch. At the down-stream end of the flume on each side 11 thereof is secured an upright 12 provided with bearings for a horizontal shaft 13 upon which is mounted a water wheel 14, the blades 15 of which dip into the water in the flume, and through the force of the current the wheel 14 is rotated. Fixed on one end of the shaft 13 is a disk 16, on the periphery of which are two lifting cams 17 and 18, the use of which will be explained hereinafter.

At the up-stream end of the flume is an upstanding box-like member 19, the sides 20 of which each support a longitudinal beam 21, rigidly connected at the top by cross bars 22 which serve to brace the beams and the box 19 as do also other cross bars 23 and 24 on the down and upstream sides of the box. Midway of the box 19 on each side, is a vertical guide bar 25, spaced from which, on the upstream side is a similar but smaller bar 26, the space between forming a guideway for a vertically movable screen 27. On the downstream side of the guide bars 25 are vertical guide bars 28 providing a passageway for a screen 29, this passageway being slightly wider than the screen to permit the latter a limited movement in the longitudinal direction of the apparatus.

The screens 27 and 29 may be made in any approved manner, but in the present instance, are shown as formed of a horizontal head 30 extending across the box 19 and slidable between the vertical guides, said heads having spaced and parallel depending fingers 31 of sufficient length to reach the bottom of the flume before the head 30 enters the water. The fingers 31 are placed sufficiently close together to prevent the passage therebetween of fish and thus they are prevented from passing up the irrigating ditch.

In the normal working condition of the apparatus, the screen 29 is lowered into the flume while the screen 27 remains elevated. The movement of said screens and the manner of retaining them in their normal positions may be described as follows: In the down-stream ends of the beams 21 is pivotally mounted a transverse shaft 32 to which is secured one or more arms 33 which project toward the screen 29, and connected to their free ends are cables or other flexible connections 34 which are also attached to the screen 29, the weight of which screens being sufficient when the shaft 32 is free to rock, to keep the screen in the flume. A similar shaft 35 is carried in the up-stream ends of the beams 21 and from the down-stream ends of arms 36 secured to said shaft are flexible connections 37 also attached to the screen 27. The opposite ends of the arms 36 extend beyond the axis of the shaft 35 and are provided with weights 38 sufficient to overcome the weight of the screen 27 and when the shaft 35 is free to rotate will hold said screen in elevated position out of the ditch.

Between the vertical guides 25 is a cross bar 39 at such a height above the bottom 10 that its under side will be but little below the under side of the screen heads 30 when in lowered position. To the under side of this cross bar are fastened a number of parallel longitudinally extending fingers 40 that pass beyond said bar in both the upstream and downstream direction and through the fingers of the screens 27 and 29 and serve when said screens are raised as cleaners therefor to remove any debris that has been brought down by the water of the ditch and collected against the screen when in lowered position. The debris removed by the fingers will be free to float on with the water in the ditch.

Extending across the flume between the screen 29 and the water wheel 14 is a horizontal lever 41 pivoted at one end 42 to one of the flume sides 11 and slidable horizontally in an up and down stream direction in a guide 43 mounted on the other flume side. Pivoted to this lever intermediate its ends is a longitudinal push bar 44, the free upstream end of which passes freely through the brace bar 23 and is held in contact with the head 30 of the screen 29 by means of a spring 45 which may resemble that shown or be of any other suitable form. The end 46 of the bar 44 that passes through the cross bar 23 is of reduced size to form a shoulder 47 that bears upon the cross bar and limits the movement of the bar 44 toward the screen. Under normal conditions the spring 45 acting on the bar 44 holds the shoulder 47 thereof against the cross bar 23 so that the projected end 46 of said slide bar bears against the head 30 of the screen 29 and holds the latter against the vertical guides 25 and away from the guide 28. Pressure upon the screen sufficient to overcome the spring will force the push bar 44 toward the water wheel 14 and rock the horizontal lever 41.

On one end of the shaft 32 is a depending lever 48, its lower end being pivoted to one end of a horizontal slide bar 49 that extends in a down-stream direction over the cam disk 16 and between upright guides 50 and 51, being supported at this end by a cross bar 52 over which the slide bar 49 moves freely. On the under side of the slide bar 49 are two lugs 53 and 54, the latter being curved or inclined on its down-stream end at as 55.

The shaft 35 has attached on one end an arm 56 similar to the arm 48, and like it, pivotally connected to one end of a slide bar 57 that lies substantially parallel to the slide bar 49 and passes over the disk 16 between upright guides 51 and 50ª and movable freely over the cross bar 52. On the under side of the slide bar 57 is a lug 58 above the disk 16 and two other lugs 59 and 60 spaced therefrom in an up-stream direction, the latter being beveled similar to the lug 54, while the lug 58 has an inclination on its opposite end. Pivotally mounted on the side of a box-like member 19 below the slide bar 57 is a lever 61 the upper end of which is provided with a finger 62 adapted to engage at certain times with a notch 63 formed in the under side of the slide bar for the purpose of holding the slide bar in an up-stream direction and the secondary gate 27 in its lowered position. Below the disk 16 is a lever 64 pivoted at 65 intermediate its ends to one side 11 of the flume, the upper end of the lever being adapted to lie in the path-way of the cam 18 on said disk and of being operated by it. A rod or other connection 66 extends from the upper end of lever 64 to the lower end of lever 61 so that when the former lever is operated by the cam 18 the lever 61 will be drawn out of engagement with the notch 63 in the slide bar 57 and the latter permitted to return to its normal position.

Pivoted to the same side 11 of the flume between the water wheel and the screen are two levers 67 and 68, the former being connected above its pivot 69 to the horizontal lever 41. The upper end of this lever is provided with a cross head 70 on its upper end that at predetermined times engages the lug 60 for the purpose of operating the apparatus in a manner to be hereinafter described. The lever 68 is pivoted at 71 and also carries a cross head 72 on its upper end that engages with the lugs 54 and 59 for accomplishing certain results that will be detailed later. A spring 73 is connected to the lower end of the lever 68 for holding the same normally against a stop 74 projecting from the side 11 of the flume.

The apparatus, constructed as described, is placed in an irrigating ditch with the end supporting the water wheel directed down-stream. The apparatus may be completed as shown before placing the same in a ditch if of relatively small size, or brought to the site where it is to be erected, in disassembled condition, and the parts put together. In the normal position of the parts, as shown in the drawing, the screen 29 will be in the flume and extending across the same to prevent the passage of fish and held against the central uprights 25 by the spring 45, while the supplemental screen 27 will be held in elevated position by the weights 38. The levers 67 and 68 will stand in the positions shown where their respective cross heads 70 and 72 will support the lugs 60 and 54 on the under side of the respective slide bars 57 and 49, for the purpose of elevating the downstream ends of these slide bars and holding the lugs 53 and 58 above the cams 17 and 18. As will be understood, the lever 67 is maintained in its normal position by the spring 45 through its action on the bar 44 and cross lever 41, while the lever 68 is positioned to support the slide bar 49 by the spring 73.

As thus arranged the water in the ditch flows through the flume, turning without interruption, the water wheel 14 and the disk 16 on its shaft 13. Fish are prevented by the screen 29 from passing the apparatus which also collects floating debris too large to pass through the screen. As this matter collects, it forms against the up-stream side of the screen and in time this mass will gain sufficient size to press with considerable force against the screen, so much so in fact as to overcome the resiliency of the spring 45 and force the screen 29 in a down-stream direction until it is arrested by the vertical guides 28. This movement of the screen forces the push bar 44, in contact with the screen, longitudinally, which bar pivotally connected to the cross lever 41, rocks the latter which through its connection with the vertical lever 67 swings this lever in the direction indicated by the arrow, Fig. 1, and disengages the head 70 of said lever from the lug 60, thereby permitting the slide bar 57 to drop upon the cross bar 52 attached to the uprights 50, 51 and 50ª. The downward movement of the slide bar 57 brings the lug 58 on the under side thereof in position to be engaged by the cam 17 on the disk 16 as the latter rotates which pushes said slide bar in an up-stream direction, thereby rocking the shaft 35 through the arm 56 fixed thereon and lowering into the flume the normally raised screen 27, said screen being held in the flume by the upper free end 62 of lever 61 engaging the notch 63 in the under side of the slide bar 57. At the completion of this movement of the slide bar 57, the lug 59 on the under side thereof will be brought into contact with the cross head 72 on the upper end of the substantially vertical lever 68, and, rocking said lever in the direction indicated by the arrow in Fig. 1, the lug 54 on the under side of the slide bar 49 will be released, permitting said bar to drop on the cross bar 52 and bringing the lug 53 also on said bar in position to be engaged by the cam 18 on disk 16 after cam 17 has completed the movement of slide bar 57 and lowered screen 27. The slide bar 49 moved in an up-stream direction by cam 18 will, through the arm 48, rock the shaft 32 and elevate the screen 29, the upward movement of which will cause the stationary horizontal fingers 40 that pass between the fingers 31 of the screen to clear the screen from all debris and permit it to flow onward with the current of water. During this elevation, it will be understood the supplemental screen 27 is in its lowermost position and serving as a stop to prevent the passage of fish through the ditch. As soon as the cam 18 releases the lug 53, the weight of screen 29 is sufficient to cause the same to fall to its normal position, carrying the slide bar 49 by means of arm 48 in a down stream direction, thus causing the lug 54 on the under side thereof to engage and ride up on the head 72 of lever 68, the forward end of said lug being beveled or curved as at 55 as also is the engaging side of the head 72. Both screens 27 and 29 are at this time in their lowered positions, but as the water wheel 14 continues its rotation, the cam 18 will engage the lever 64 and rock the same so that the link or rod 66 will disconnect the pawl lever 61 from the notch 63 in the slide bar 57 and the latter being free to move, the supplemental screen 27 will be raised by its counter-weights 38 and at the same time move the slide bar 57 to its normal position, the lug 60 on its under side riding upon the cross head 70 to lift the lug 58 above the cam 17 so that the water wheel may rotate without engaging any part of the mechanism until the latter has been again tripped by the pressure of collected debris against the screen 29.

What I claim is:

1. A fish stop comprising a screen adapted to extend across an irrigating ditch and vertically movable, a second vertically movable screen parallel to the first screen but normally maintained above the ditch, power mechanism operable by the flowing current of water, a trip means operable by the pressure of debris collecting against the first-mentioned screen, and mechanism controlled by said trip means for causing the power means to temporarily change the positions of said screens.

2. A fish stop comprising a primary and a secondary vertically movable screen, the former screen normally maintained within an irrigating ditch and the latter above the same, power means operated by the current of water flowing through the ditch, a trip device operable by the primary screen under pressure of a collected mass of floating debris, and means operated by said trip device for causing the power means to lower the secondary screen into the ditch and raise the primary screen to clean the same from the debris.

3. A fish stop comprising a primary and a secondary vertically movable screen, said primary screen normally maintained within an irrigating ditch and the latter above the same, power means operable by the current of water flowing through the irrigating ditch, a trip device operable by the primary screen under pressure of a collected mass of floating debris, means connected to the secondary screen controlled by the trip device and operable by the power means for lowering the secondary screen into the ditch, similar means for raising the primary screen to clean it from the floating debris and operable after lowering of the secondary screen, and means also operable by the power means for causing the restoration of the screens to their normal position.

4. A fish stop comprising a flume, a pair of parallel vertically movable screens at one end of said flume, one of said screens being normally maintained within the flume and the other above the same, a water wheel at the other end of the flume operable by the current flowing therethrough, a cam disk on the shaft of said water wheel, a trip device operable by the pressure of floating debris against the screen normally maintained within the flume, slide bars connected to said screens for reversing their normal positions, and means operable by the trip device for causing said slide bars to be engaged by the cam disk for temporarily changing the positions of said screens.

5. A fish stop comprising a flume adapted to be placed in an irrigating ditch, a vertically movable primary screen normally maintained within said flume at one end, a secondary vertically movable screen adjacent the primary screen and parallel thereto, said screen being normally maintained above the flume, a water wheel mounted at the other end of the flume and operated by the current passing therethrough, a cam disk on the shaft of said water wheel, a pair of slide bars each connected to means for raising and lowering said screens, a trip device operable by the pressure against the primary screen of floating debris, means on said slide bars for causing their operation by said cam disks, means for normally maintaining said slide bars out of engagement with the cam disks and adapted to be operated by said trip device to release said slide bars and permit their operation by the cam disk for temporarily changing the normal position of said screens for the purpose of clearing the primary screen of debris, and means also operable by said cam disk for restoring the screens to normal position.

6. A fish stop comprising a flume adapted to be placed within an irrigating ditch, a primary screen vertically movable between guides and normally maintained within said flume, said screen having limited movement in a direction longitudinally of said flume, a secondary vertically movable screen parallel to the primary screen normally maintained above the flume, a water wheel mounted at the opposite end of said flume and rotated by the current flowing therethrough, a cam disk on one end of said water wheel, a pair of rock shafts and arms thereon connected to said screens by means of which the latter may be raised and lowered, a slide bar operably connected to each of said rock shafts and adapted to be moved endwise for temporarily changing the position of said screens by the rotary movement of said cam disk, means for maintaining said slide bars out of operation with said cam disk, and a trip device operable by the primary screen through the pressure thereon of floating debris and connected to said last-named means for permitting the slide bars to be engaged by the cam disk for changing the position of said screens, locking means for holding said screens in their changed position, and means operable by the cam disk for disengaging said locking means and permitting the screens to be restored to normal position by gravity.

7. A fish stop comprising a flume adapted to be placed within an irrigating ditch, vertically movable screens mounted at one end of said flume, one of said screens being normally maintained within the flume and the other above the same, the first-mentioned screen having limited movement longitudinally of the flume, a water wheel mounted at the opposite end of the flume and rotated by the current passing therethrough, a cam disk operable by said water wheel, means connected to each of said screens and adapted to be operated by said cam disk for reversing the positions of said screens to permit the cleansing of debris therefrom, a trip device operable by the pressure of collected debris for throwing said means into operation, said device comprising a vertical lever adapted to hold the screen operating means out of contact with the cam disk, a horizontal lever connected to the vertical lever for swinging the same, and a spring actuated bar connected to said horizontal lever and bearing upon the screen to hold the same at its limit of movement against the flow of the current, said bar being movable in the opposite direction under pressure of debris collected against the screen for changing the position of the screens.

8. A fish stop comprising a flume adapted to be placed within an irrigating ditch, a vertically movable primary screen extending across one end of said flume and having limited movement longitudinally of the flume, a secondary vertically movable screen parallel to the primary screen but maintained normally above the flume, a water wheel mounted at the opposite end of the flume and rotatable by the current flowing therethrough, a cam disk mounted on one end of the water wheel shaft, a shaft above each of said screens, means on said shafts for raising and lowering the screens, a depending arm on one end of each shaft, a slide bar connected to each of said arms and extending in a parallel direction above the cam disk and having means on their under sides to be engaged by the cam disk and moved longitudinally to change the respective positions of said screen, a vertical lever pivoted on the side of the flume for maintaining each of said slide bars out of engagement with said cam disk, means for locking the slide bar connected to the secondary screen for holding the same in its lowered position, a trip device operable by the primary screen under pressure of debris collected against its upstream side for releasing said slide bars to permit engagement by the cam disk whereby the positions of the screens are temporarily changed to clear the same from collected debris, and means also operated by said cam disk for releasing the slide bar locking device to permit the return of the screens to normal position.

In testimony whereof I affix my signature in presence of two witnesses.

JAMES W. HALL.

Witnesses:
 A. L. WOOD,
 GEO. H. EGGLESTON.

Copies of this patent may be obtained for five cents each, by addressing the "Commissioner of Patents, Washington, D. C."